Figure 1:
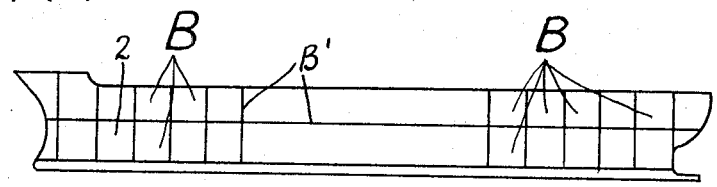

United States Patent
Terai et al.

[15] 3,658,286
[45] Apr. 25, 1972

[54] APPARATUS FOR POSITIONING A HULL BLOCK

[72] Inventors: Kiyoshi Terai, Ashiya; Takashi Itoh; Ryuichi Sagawa, both of Kobe, all of Japan

[73] Assignee: Kawasaki Jukogyo Kabushiki Kaisha, Kobe, Japan

[22] Filed: Mar. 27, 1970

[21] Appl. No.: 23,425

[30] Foreign Application Priority Data

Mar. 28, 1969 Japan..................................44/28512

[52] U.S. Cl. ..........................248/371, 114/79 W, 219/158, 248/184, 269/309
[51] Int. Cl....................................................F16m 11/14
[58] Field of Search.................114/79 W, 79; 248/371, 396, 248/179, 184, 178, 180, 181, 182, 188.2, 188.3, 398; 269/309; 219/158; 228/48, 49; 29/559

[56] References Cited

UNITED STATES PATENTS

| | | | |
|---|---|---|---|
| 3,018,992 | 1/1962 | Lore | 248/180 |
| 3,215,391 | 11/1965 | Storm | 248/184 X |
| 3,374,977 | 3/1968 | Moy | 248/396 X |
| 3,288,421 | 11/1966 | Peterson | 248/179 X |

FOREIGN PATENTS OR APPLICATIONS 197,816  11/1967  U.S.S.R. ................................219/158

*Primary Examiner*—J. Franklin Foss
*Attorney*—Milford A. Juten

[57] ABSTRACT

A block having three dimensional curves thereon is supported on a table by means of vertically extending struts which are adjustable to support the block and the plates forming the block in proper abutting relation of the plates in welding the abutting plates. The table is supported centrally on a universal joint so that the table may swing about either of two intersecting axes and to positively move the table so that any particular portion of the seam of the block is horizontal and this is accomplished by pushing and pulling devices which may be hydraulic cylinders reacting against a base and against the table with one push-pull device spaced from one axis and the other push-pull device spaced from the other axis so that the universal joint supporting the table is not in alignment with the push-pull devices. It is easier to weld a seam when the seam is horizontal and any portion of the hull block can be positioned by means of the push-pull devices to make any portion horizontal or such portion being welded and by proper manipulation of the push-pull devices the portion being welded can always be horizontal for a maximum welding efficiency.

10 Claims, 3 Drawing Figures

PATENTED APR 25 1972 3,658,286

INVENTOR.

APPARATUS FOR POSITIONING A HULL BLOCK

In the ship building industry shaped iron plates are welded together to form hull blocks and a number of such hull blocks are assembled in final form in making the complete ship hull. Heretofore the hull blocks have been made by supporting the plates on a table and arranging push-pull devices to move the table so that any portion of the seam between adjacent plates would be horizontal. But such push-pull devices have been placed at the edge of the table and have been secured to both the table and the base to maintain the proper relation and in applying force of pushing or pulling on such push-pull devices, strains were formed in the table and in the push-pull devices so that it was extremely difficult to maintain the hull block with a particular portion of a seam in horizontal relation.

An object of the present invention is to provide a table for supporting hull blocks or the like so that the table with the hull blocks thereon can be rocked about two non-parallel axes so that any particular portion of the hull block can be made horizontal for maximum welding efficiency.

Another object of the invention is to provide a simple structure for supporting hull blocks or the like to increase the efficiency of welding.

Another object of the invention is to provide a method of efficiently welding plates of curved shape so that the welding is done in a horizontal position for maximum efficiency.

Figure 2:
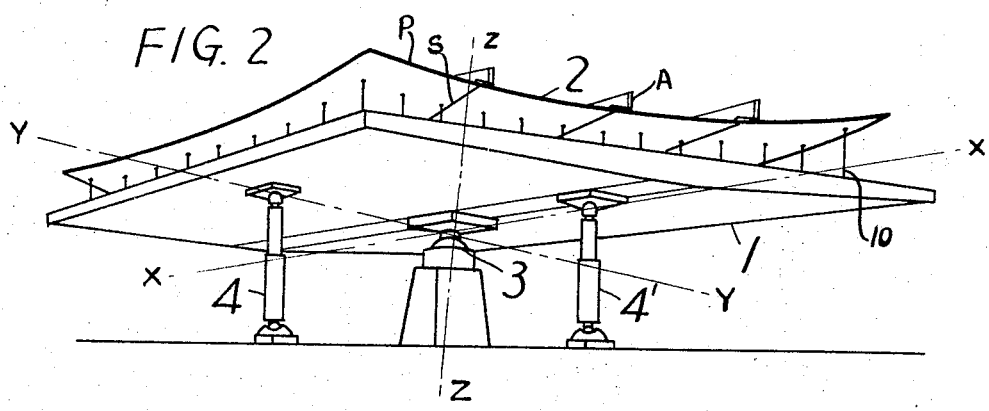
Figure 3:
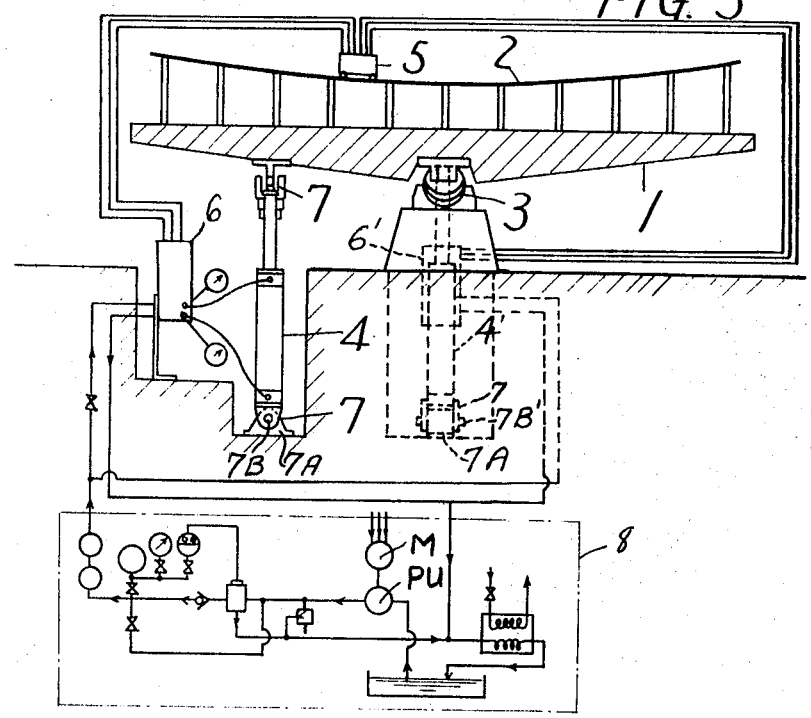

Other and further objects will appear as the description proceeds and upon reference to the accompanying drawings wherein:

FIG. 1 is a diagrammatic side elevation of a ship hull divided into hull blocks by intersecting lines;

FIG. 2 is a perspective of the structure for supporting the plates of curved hull blocks or the like showing the axes about which the table thereof can be rocked; and FIG. 3 is a sectional view through the table and the universal joint supporting the table centrally thereof and one of the push-pull devices for producing rocking motion about one axis, the other push-pull device being shown but the control means including the level indicators and the hydraulic system being included.

The present invention provides a work supporting table which may rock about two non-parallel axes so that the table can support a block having three dimensional curves with suitable strut means extending between the table and the bottom surface of the block having the three dimensional curves so that any portion of the block can be adjusted to be in a perfectly horizontal position so that welding can be accomplished from above the block to obtain maximum efficiency in the welding speed as well as maximum efficiency in the resulting welded seam with an increase in the economical production of the blocks of approximately 20 percent or more.

Referring more specifically to the blocking, FIG. 1 is an elevation of the hull of a ship showing hull blocks B defined by the lines B' therein and FIG. 2 shows a particular block such as block 2 having three dimensional curvature of the individual panels or plates P forming the block 2. A table 1 while approximately the same size as the block P is provided with bar stays 10 which are adjustable and are adjusted to correspond to the three dimensional curvature of the individual plates P and of the entire block 2. The table 1 is supported on a universal joint 3 shown as of the ball-and-socket type, which universal joint is positioned substantially vertically beneath the center of gravity of the table and the center of gravity of the block 2 and such strut bars are preferably fixed at their lower ends to the table 1 and being telescopically adjustable so that the upper ends of the strut bars 10 define the three dimensional curvature of the block B formed by the plates P. For the purposes of illustration, an axis X—X extending lengthwise of the table and passing through the perpendicular point above the universal joint 3 is illustrated at one axis about which the table 1 may rock and the rocking of the table 1 about axis X—X is accomplished by a hydraulic cylinder and piston 4 which operate for pushing and pulling and the upper and lower ends thereof are provided with universal joints to permit the rocking action about axis X—X. A similar hydraulic cylinder and piston 4' are provided to rock the cable 1 about the axis Y—Y which passes over the center of the supporting universal joint 3 and through the point above the top universal joint of hydraulic cylinder and piston 4. It will also be noted that the axis X—X passes over a point above the top universal joint of hydraulic cylinder and piston 4'. It will thus be seen that the table 1 and the block 2 thereon can be rocked about either axis X or axis Y to provide the adjustment so that any portion of the block B and particularly the portions of the block B along the seams S can be made perfectly horizontal as the welding operation is carried out along the seams.

To prevent a rotation movement about the vertical axis through the universal joint 3, one end of at least one cylinder and piston is hingedly connected by the lower end of the cylinder 4C being provided with a bifurcated clevis 7 which cooperates with a pillow block 7A fixed to a base structure so that pivotal movement of the cylinder and piston 4 is limited to movement about the axis 7B which is perpendicular to the paper in FIG. 3. This pivotal action about the axis 7B prevents angular movement of the cylinder and piston 4 about the Z vertical axis through the universal joint 3. The other piston and cylinder 4' may be similarly pivoted to additionally prevent this rotation about the Z-axis passing vertically through the universal joint 3. It will be apparent that the hydraulic cylinder and pistons 4 and 4' can be connected at both ends by a pivot pin 7B and 7B' with the pivot pins being parallel to the axis about which the table and the block rocks.

As illustrated, a hydraulic system shown at 8 includes a storage tank from which the hydraulic fluid is pumped by a pump PU driven by the motor M and the hydraulic fluid may move to the various conduits and valves as shown by the arrows indicating a line flowing to the upper ends of the cylinders and another line to the lower ends of the cylinders with a solenoid controlled three-way valve 6 or 6' to cause movement of pushing or pulling by the hydraulic cylinders 4 and 4'.

To automatically position the table so that the portion of the supported hull block 2 has the portion being welded in substantially a horizontal position, the level 5 is arranged to have indicators to show the inclination of the device 5 which contacts the inner surface of the hull block 2 and such level indicating device may take the form of the spirit level or the pendulum indicating level or any other suitable type of level with contacts engageable to correct any non-horizontal position of the level device 5 and as shown three leads from the leveling device 5 to the three-way valve 6 will control the pushing and pulling hydraulic ram 4 to cause rocking in a clockwise or counterclockwise direction about the axis X—X. Similarly, the leveling device has a level indicating structure which actuates the leads from the leveling indicating device 5 to the valve 6' to thereby actuate the pushing and pulling hydraulic ram 4' to rock the table 1 and the hull block 2 about axis Y—Y.

It will thus be seen that the present invention provides for a self-leveling action of the increment of the hull block being welded at any particular time so that the welding can continue without interruption. It will also be apparent that manual control of the hydraulic rams 4 and 4' can be provided by a three-way valve of the type previously described in which one position of the valve causes lengthening of the hydraulic ram and another position of the valve causes shortening of the hydraulic ram with a third position preventing movement of the hydraulic liquid in either direction and maintaining the table and the hull block in fixed position.

It will be apparent that the welding is carried out to produce the proper reinforced hull block by welding the seams of the panels or plates P together and then applying angle structural members A or any other suitable structural members and welding them in the proper position.

It will be observed that the center of gravity of the table and of the hull block is substantially vertically over the universal joint 3 so that a minimum of force is required by the hydraulic rams 4 and 4' to accomplish their intended purpose and it will also be noted that there are no strains caused on the table 1 by the operation of the hydraulic rams.

In the prior art tables for supporting work have been made adjustable by having hydraulic rams at various locations within the plan outline of the table but such hydraulic cylinders were required to be fixed against swinging movement so that they could properly support the table and in using the hydraulic rams of the prior art it was extremely difficult to lengthen by pushing or shorten by pulling the hydraulic rams without producing bending strains on the table and on the hydraulic rams and also a great deal of time was required to accomplish the desired adjustment to produce a horizontally positioned welding area. Also the rams used as described in the prior art were affected by a bending action because of the fixed ends of the prior art rams.

With the present invention the universal type support located below the center of gravity carries all of the weight of the table and the hull block and the hydraulic rams 4 and 4' need only to apply a very small force to obtain the necessary positioning of the welding area. Consequently, much smaller size hydraulic rams are required with the present invention than with the practice of the prior art. The present invention also contemplates the use of electrically operated push-pull devices in which an electric motor is operated in forward and reverse directions to produce pushing and pulling of the rams 4 and 4', thereby simplifying the structure. Such electrically operated devices may include the nut and screw type of adjustment and in the present invention the rams 4 and 4' operate in both a pushing and pulling direction and are attached to the ground or base and to the table by joints which apply the pulling or pushing force on the table so that in case workmen would collect on the side away from the push-pull supporting device, the torque caused by the change of the center of gravity of the work and the workmen is offset by the positive prevention of lengthening of the ram by the tensile force caused by the displacement of the center of gravity.

It will be noted that angles A or other suitable reinforcements are applied as necessary and are generally arranged symetrically with respect to the center of gravity of the table 1 and the block 2.

It will be apparent the universal joint 3 may be of the type made with two clevises pivotally connected to a common member similar to the type conventionally used in the drive mechanism of conventional automobiles for transmitting torque, at any suitable angle.

It will also be apparent that the control valves 6' can be operated manually by parallel hand-operated valves can be provided.

It will be apparent that changes may be made within the scope of the invention as defined by the valid interpretation of the claims.

What is claimed is:

1. A supporting structure for a block having three dimensional curves comprising a table, means on said table for support of the curved surface of the block to provide adequate support for the plates forming the block so that seams to be welded will be in substantially abutting relation, a universal joint supporting the table substantially centrally thereof and substantially centrally of the block supported thereby so the center of gravity of the block and table is substantially directly over the universal joint supporting the table for rocking movement of the table about non-parallel axes, a first ram extending from a base or ground to the table offset from the one axis and a second ram extending from said base to the table and offset from said second axis so that the rams and the universal joint supporting the table are out of alignment, means to apply pushing and pulling forces to the rams to thereby rock the table, and means to operate the rams so that a portion of the seam between the plates is substantially horizontal so that welding can be performed on said horizontal portion of the seams.

2. The invention according to claim 1 in which the level sensitive structure is supported on the block in the area being welded and means reacting to the level indicating device for causing the rocking movement by the pushing and pulling action of the rams.

3. The invention according to claim 1 in which bar stays or struts extend upwardly from the table and are adjustable as to length so that the curvature of the hull block will be accommodated and so that the abutting edges of the plates will be maintained in the correct position for the final structure.

4. The invention according to claim 1 in which manual means are provided to cause pushing and pulling action of the pushing and pulling rams.

5. The invention according to claim 2 in which manual means are provided to cause the pushing and pulling action of the pushing and pulling rams.

6. The invention according to claim 1 in which means are provided to mount at least one of said rams for pivotal movement in a plane which would prevent rotation of the table about a vertical axis.

7. The invention according to claim 1 in which the structure includes pivot means which permit swinging movement about two intersecting axes only.

8. The invention according to claim 1 in which the supporting universal joint is limited to movement about two intersecting axes.

9. The invention according to claim 1 in which the universal joint supporting the table is made of two clevices pivoted on perpendicularly intersecting axes to the single X-shape member.

10. The invention according to claim 1 in which stabilizing means are provided between the table and the supporting ground or base.

* * * * *